(12) United States Patent
Bodin

(10) Patent No.: US 12,446,612 B2
(45) Date of Patent: Oct. 21, 2025

(54) POUCHED PRODUCT FOR ORAL USE

(71) Applicant: SWEDISH MATCH NORTH EUROPE AB, Stockholm (SE)

(72) Inventor: Aase Bodin, Fjärås (SE)

(73) Assignee: Swedish Match North Europe AB, Stockholm (SE)

( * ) Notice: Subject to any disclaimer, the term of this patent is extended or adjusted under 35 U.S.C. 154(b) by 0 days.

(21) Appl. No.: 18/849,639

(22) PCT Filed: Mar. 31, 2023

(86) PCT No.: PCT/EP2023/058565
§ 371 (c)(1),
(2) Date: Sep. 23, 2024

(87) PCT Pub. No.: WO2023/194261
PCT Pub. Date: Oct. 12, 2023

(65) Prior Publication Data
US 2025/0107562 A1 Apr. 3, 2025

(30) Foreign Application Priority Data
Apr. 7, 2022 (EP) .................................. 22167197

(51) Int. Cl.
*A24F 13/00* (2006.01)
*A24B 13/00* (2006.01)
(Continued)

(52) U.S. Cl.
CPC .............. *A24B 13/00* (2013.01); *A24B 15/16* (2013.01); *D04H 1/4258* (2013.01);
(Continued)

(58) Field of Classification Search
None
See application file for complete search history.

(56) References Cited

U.S. PATENT DOCUMENTS

2016/0073689 A1* 3/2016 Sebastian .............. D04H 1/435
156/181

FOREIGN PATENT DOCUMENTS

| EP | 3192380 | 7/2017 |
|---|---|---|
| WO | WO 2012/069505 | 5/2012 |

(Continued)

OTHER PUBLICATIONS

International Search Report and Written Opinion were mailed on May 16, 2023 by the International Searching Authority for International Application No. PCT/EP2023/058565 filed on Mar. 31, 2023 and published as WO2023194261 (Applicant- Swedish Match North Europe AB) (11 pages).

(Continued)

*Primary Examiner* — Philip Y Louie
(74) *Attorney, Agent, or Firm* — Ballard Spahr LLP

(57) ABSTRACT

Described is a pouched product for oral use that includes a saliva-permeable pouch and a filling material which is enclosed in the pouch. The pouch is formed from a nonwoven material that includes fibres and a binder. The fibres in the nonwoven material are cellulose fibres and the binder is a biodegradable polyester-polyurethane binder applied to the fibres of the nonwoven material. The binder is present in an amount within the range of from 17% by weight to 29% by weight based on a total weight of the pouch material.

15 Claims, 2 Drawing Sheets

(51) Int. Cl.
     *A24B 15/16*      (2020.01)
     *A24F 15/16*      (2006.01)
     *D04H 1/4258*     (2012.01)
     *D04H 1/587*      (2012.01)
     *D04H 1/64*       (2012.01)
     *D21H 13/08*      (2006.01)
     *D21H 17/57*      (2006.01)
     *D21H 27/00*      (2006.01)

(52) U.S. Cl.
     CPC ............... *D04H 1/587* (2013.01); *D04H 1/64* (2013.01); *D21H 13/08* (2013.01); *D21H 17/57* (2013.01); *D21H 27/00* (2013.01); *D10B 2401/063* (2013.01); *D10B 2505/10* (2013.01)

(56) References Cited

FOREIGN PATENT DOCUMENTS

| | | |
|---|---|---|
| WO | WO 2016/040754 | 3/2016 |
| WO | WO 2023/194261 | 10/2023 |

OTHER PUBLICATIONS

Epotal ® ECO 3702 Technical Information—BASF, Nov. 2016.
European Search Report was mailed on Sep. 26, 2022 by the European Patent Office for European Patent Application No. EP22167197 filed on Apr. 7, 2022 and published as EP 4256979 (Applicant—Swedish Match North Europe AB) (5 pages).

\* cited by examiner

POUCHED PRODUCT FOR ORAL USE

CROSS-REFERENCE TO RELATED APPLICATIONS

This application is a U.S. National Phase Application of International Application No. PCT/EP2023/058565, filed Mar. 31, 2023, which claims priority to European Application No. 22167197.7, filed Apr. 7, 2022, each of which are hereby incorporated by reference in their entirety.

TECHNICAL FIELD

The disclosure pertains to a pouched product for oral use comprising a chemically bonded nonwoven web. The oral pouched product may be a tobacco product, a tobacco-free product, or a substantially tobacco-free oral pouched product.

BACKGROUND

The present disclosure relates to the field of pouched products for oral use, also referred to herein as oral pouched products. The oral pouched products as disclosed herein may be tobacco-free or substantially tobacco-free products as well as tobacco products. Such products are provided in the form of a pouch containing a filling material and are sized and configured to be accommodated in the oral cavity of a user, such as between the gum and the upper lip of a user.

The oral pouched products are commonly packaged in a user container which is a pocket-sized container typically containing in the range of 10 to 30 oral pouched products. The pouched products may be placed randomly in the user container or may be placed in a pattern, for instance as described in WO 2012/069505.

The material used to form the pouch containing the filling material is commonly a saliva permeable nonwoven material. Nonwoven materials are fibrous web materials made by methods other than conventional textile forming methods such as weaving or knitting. The nonwoven materials may be formed by dry or wet web-forming methods and may comprise fibres or filaments of any length. The fibres used in nonwoven materials may be natural or man-made fibres or any blend thereof. The fibres are formed into a consolidated fibrous web by methods such as needling, hydroentanglement, chemical bonding, heat induced bonding, etc.

A commonly used type of nonwoven material for oral pouched products is a bonded carded nonwoven web comprising staple fibres of regenerated cellulose, such as viscose fibres and a chemical binder, such as an acrylate binder.

In order to be able to efficiently produce oral pouched products at high production speeds, it is desirable that the nonwoven pouch material is thermo-sealable, allowing the pouches to be sealed using methods such as thermo-welding or ultrasonic welding and avoiding the use of adhesives or mechanical sealing methods such as needling.

To achieve thermo-sealability, the nonwoven materials commonly comprise a thermoplastic component, such as a thermoplastic binder and/or thermoplastic fibres which may be softened or melted to create a weld seal.

However, the requirement for thermo-sealability has been found to be conflicting with environmental concerns as thermoplastic materials generally have poor degradability and will remain virtually intact under normal composting conditions.

In view of the above, there is a need of an improved environmentally friendly pouched oral product which can be efficiently and economically produced.

An object of the present invention is to overcome or at least mitigate some of the problems associated with the prior art weldable nonwoven materials.

SUMMARY

One or more of the above objects may be achieved with an oral pouched product according to claim 1. Variations of the disclosure are set out in the dependent claims and in the following description.

The present disclosure is directed to a pouched product for oral use comprising a saliva-permeable pouch and a filling material being enclosed in the pouch. The pouch is formed from a nonwoven material comprising fibres and a binder. The fibres in the nonwoven material are cellulose fibres and the binder is a biodegradable polyester-polyurethane binder applied to the fibres of the nonwoven material. The binder is present in an amount within the range of from 17% by weight to 29% by weight based on a total weight of the pouch material.

The pouch of the pouched product as disclosed herein is formed from a nonwoven material, i.e., the pouch material as disclosed herein consists of the nonwoven material.

The fibres in the nonwoven material of the pouched products as described herein are cellulose fibres, i.e., 100% of the fibres consist of cellulose. Cellulose fibres are generally considered to be biodegradable. The cellulosic fibres as disclosed herein may comprise or consist of regenerated cellulose fibres such as viscose fibres and Lyocell fibres.

The binder as described herein is a biodegradable polyester-polyurethane binder applied to the fibres of the nonwoven material such that the nonwoven material is free from any non-biodegradable binder. Further, the binder in the nonwoven material as described herein consists only of the polyester-polyurethane binder. Accordingly, no thermoplastic polymers are present in the nonwoven material of the pouched product for oral use as disclosed herein.

The binder according to the present disclosure is a chemical binder, i.e., the nonwoven material as disclosed herein comprises a non-fibrous binder. The binder is thus not a fibrous component of the nonwoven material. Further, the binder according to the present disclosure is a non-particulate binder.

The present disclosure is based on the surprising finding that the presence of a biodegradable polyester-polyurethane binder in such a low level as from 17% to 29% by weight based on the total weight of the pouch material is enough to achieve satisfactory bonding of the nonwoven web.

It is well known that polymers such as polyolefins, which are used in conventional chemical binders, are not degradable. Even if present in small amounts in a nonwoven material used in a pouched product, they may delay product breakdown and may negatively affect the compostability of the products. Also, even if a substantially biodegradable nonwoven material is broken down, microscopic residues of non-biodegradable material may remain intact.

Consequently, as no non-degradable polymers are present in the nonwoven material according to the present disclosure and as the binder and the fibres of the nonwoven web are biodegradable, the nonwoven pouch material as disclosed herein may disintegrate completely under composting conditions. Further, the filling material in the pouched product as described herein, such as tobacco-based as well as microcrystalline-based filling materials are biodegradable. It has been reported that upon digesting tobacco waste for biogas production and using the digested tobacco in biofertilizers, tobacco is considered to have a positive impact on the fertilizer quality. Further, nicotine content has been observed to drop markedly in the presence of microorganisms and during composting.

When the fibres in the nonwoven material as well as the binder are biodegradable such that the combination of fibres and binder material is biodegradable, several further advantages may be obtained. For example, the product may preferably be sufficiently biodegradable to meet home composting standards, which may be different in different countries, e.g., NF T51-800 Plastics-Specifications for plastics suitable for home composting (2015), OK compost HOME certification scheme of TÜV AUSTRIA Belgium, and AS 5810 Biodegradable plastics-Biodegradable plastics suitable for home composting. These home composting standards require the product to be broken down in a compost during the test time specified in the particular home composting standard.

Products which are unintentionally thrown on the ground, may disintegrate over time and eventually be integrated with the soil. An advantage is that there will be less load on the environment.

The pouched product for oral use as disclosed herein may be a tobacco product, tobacco-free product or substantially tobacco-free product, such as nicotine containing smokeless non-tobacco product.

The pouched product as disclosed herein comprises cellulose fibres, wherein the cellulose fibres may comprise or consist of staple fibres which have a fibre length in the range of from 10 mm to 52 mm, such as in the range of from 25 mm to 52 mm, such as in the range of from 35 mm to 45 mm, such as in the range of from 37 mm to 42 mm.

It is surprising that presence of a binder in such a relatively low level as from 17% to 29% by weight based on the total weight of the pouch material is sufficient to obtain satisfactory bonding of the nonwoven web comprising the staple fibres having a fibre length in the range of from 10 mm to 52 mm.

The pouched product as disclosed herein may comprise or consist of staple fibres which may have a linear density in the range of from 0.9 decitex to 2.2 decitex, such as in the range of from 1.1 decitex to 2.0 decitex, such as in the range of from 1.3 decitex to 1.8 decitex, such as in the range of from 1.5 decitex to 1.8 decitex, such as in the range of from 1.6 decitex to 1.8 decitex. Further, the nonwoven material of the pouched product as disclosed herein may be a dry-formed nonwoven material The dry-formed nonwoven material of the pouched product as disclosed herein may be a carded nonwoven material.

The oral pouched product as described herein may comprise a dry-formed nonwoven material, such as carded nonwoven material in which the fibres comprise or consist of staple fibres having a fibre length in the range of from 10 mm to 52 mm, preferably in the range of from 25 mm to 52 mm, more preferred in the range of from 35 mm to 45 mm, and most preferred in the range of from 37 mm to 42 mm and having a linear density in the range of from 0.9 decitex to 2.2 decitex, preferably in the range of from 1.1 decitex to 2.0 decitex, more preferred in the range of from 1.3 decitex to 1.8 decitex, or in the range of from 1.5 decitex to 1.8 decitex, and most preferred in the range of from 1.6 decitex to 1.8 decitex.

Fibre blends comprising coarser fibres and finer fibres in combination and/or comprising longer fibres and shorter fibres are also contemplated for the nonwoven materials for the oral pouched products as disclosed herein.

The fibre length is the average fibre length of the staple fibres. For fibre blends comprising different types of fibres, the fibre length is determined for each type of fibres as the average fibre length for the particular type of fibres.

In the same way, the linear density is the average linear density of the staple fibres. For fibres in a blend comprising different types of fibres, the linear density is determined for each type of fibres in the blend.

The oral pouched product as described herein may comprise a dry-formed nonwoven material, such as carded nonwoven material in which the fibres comprise or consist of staple fibres having a fibre length in the range of from 35 mm to 45 mm and having a linear density in the range of from 1.6 decitex to 1.8 decitex.

Further, the oral pouched product as described herein may comprise a dry-formed nonwoven material, such as carded nonwoven material in which the fibres comprise or consist of staple fibres having a fibre length in the range of from 35 mm to 45 mm and having a linear density in the range of from 0.9 decitex to 1.0 decitex.

The cellulose fibres in the pouched product as disclosed herein may comprise or consist of staple fibres having a fibre length in the range of from 3 mm to 25 mm, such as in the range of from 5 mm to 12 mm, such as in the range of from 6 mm to 10 mm, such as in the range of from 7 mm to 9 mm. Such shorter fibres may be particularly useful in wet-laid nonwoven materials used in the oral pouched products as disclosed herein.

It is surprising that presence of a binder in such a relatively low amount as from 17% to 29% by weight based on the total weight of the pouch material has been found sufficient to obtain satisfactory bonding of the nonwoven webs as disclosed herein.

The staple fibres of the pouched product as disclosed herein may have a linear density in the range of from 0.7 decitex to 6 decitex, such as in the range of from 0.8 decitex to 4 decitex, such as in the range of from 2 decitex to 3.5 decitex, such as in the range of from 0.8 decitex to 1.0 decitex.

The cellulose fibres in the pouched product as disclosed herein may comprise or consist of regenerated cellulose fibres such as viscose fibres, lyocell fibres, or the like.

It has been found that an oral pouched product as disclosed herein comprising or consisting of regenerated cellulose fibres such as viscose fibres, lyocell fibres, or the like, generates a soft and comfortable pouched product with improved organoleptic properties for the user.

The polyester-polyurethane binder in the pouched product as disclosed herein, may be present in an amount within the range of from 17% by weight to 27% by weight, preferably within the range of from 17% by weight to 25% by weight, and more preferred within the range of from 17% by weight to 20% by weight, based on the total weight of the pouch material.

Further, the polyester-polyurethane binder in the pouched product as disclosed herein may be applied to the fibres in the nonwoven material in the form of a polyester-polyurethane dispersion. The binder is thus not a fibrous part of the nonwoven material.

The polyester-polyurethane binder in the pouched product as disclosed herein may be applied to the fibres in the nonwoven material by spraying, pouring, coating, or soaking the nonwoven web in a polyester-polyurethane dispersion or by any suitable manner such that the polyester-polyurethane binder is applied on to the fibres of the nonwoven web.

The polyester-polyurethane binder in the pouched product as disclosed herein may be an aqueous dispersion of a polyester-polyurethane elastomer such as Epotal® ECO 3702, provided by BASF.

The pouched product for oral use as disclosed herein may be a smokeless non-tobacco product, such as a nicotine containing smokeless non-tobacco product. A tobacco free smokeless non-tobacco product may contain trace amounts of tobacco, below 0.05 wt %.

The pouched non-tobacco products for oral use as disclosed herein may contain an active agent such as nicotine, i.e., they may be pouched nicotine-containing products for oral use. Alternatively, the pouched non-tobacco products for oral use may be free from nicotine, i.e., they may be pouched nicotine-free smokeless products for oral use.

While nicotine is a well-known stimulant, the use of a cannabinoid such as cannabidiol as an active agent in oral smokeless products is more recent. The cannabinoids are chemical compounds found in the *cannabis* plant. The most well-known cannabinoid is tetrahydrocannabinol (THC), which has a psychotropic effect capable of affecting the mind, behaviour and/or emotions of an individual taking it. However, not all cannabinoids exert a psychotropic effect. For instance, the cannabinoid cannabidiol (CBD) is not associated with a psychotropic effect. Cannabidiol constitutes up to 40% of the *cannabis* plant. Cannabidiol, $C_{21}H_{30}O_2$, may be extracted from the *Cannabis* plant or may be prepared synthetically. Cannabidiol has shown to have e.g., anti-depressive effect, calming effect, anti-anxiety effect, sleep promoting effect, anti-inflammatory effect and antipsycotic effect. Further, cannabidiol has been shown to be effective in reduction of tobacco and/or nicotine addiction. Cannabidiol has been used in pharmaceutical compositions for antiepileptic effect and is also believed to be useful for treating diseases such as Parkinson disease and Crohn disease.

The cannabinoids which are contemplated for the oral smokeless products as disclosed herein may be one of more of the following: tetrahydrocannabinol (THC), tetrahydrocannabinolic acid (THCA), cannabidiol (CBD), cannabidiolic acid (CBDA), cannabinol (CBN), cannabigerol (CBG), cannabichromene (CBC), cannabicyclol (CBL), cannabivarin (CBV), tetrahydrocannabivarin (THCV), cannabidivarin (CBDV), cannabichromevarin (CBCV), cannabigerovarin (CBGV), cannabigerol monomethyl ether (CBGM), cannabielsoin (CBE) and cannabicitran (CBT).

Caffeine is also a well-known stimulant which may be used as an active agent in the oral smokeless products as disclosed herein.

Further active agents which may be used in an oral smokeless product as disclosed herein are *ginseng*, taurine and branched-chain amino acids (BCAA).

The oral smokeless product may comprise a combination of any of the active agents as disclosed. Some of the active agents may be useful together.

The oral smokeless product may comprise nicotine in amount of 1 mg to 25 mg, preferably 1 mg to 10 mg or more preferably 2 mg to 8 mg.

The pouched smokeless non-tobacco product as disclosed herein may further comprise a small amount of added tobacco, which provides a low tobacco snuff composition for oral use. Furthermore, in addition to a small amount of tobacco, the product may comprise non-tobacco plant material as described herein and/or a filling material, such as Microcrystalline Cellulose (MCC), as described herein. The composition of a pouched smokeless low tobacco snuff product for oral use may be identical to the composition of a pouched smokeless non-tobacco product for oral use except for the presence of a small amount of tobacco. The small amount of tobacco may range from 0.05 wt % to 10 wt % based on the total dry weight of the low tobacco snuff composition, preferably from 0.05 wt % to 5 wt % of tobacco based on the total dry weight of the low tobacco snuff composition.

The nicotine in a nicotine containing tobacco free or low tobacco content composition may be synthetic nicotine and/or nicotine derived from tobacco plants. Further, the nicotine may be present in the form of nicotine base or a nicotine salt such as nicotine hydrochloride, nicotine dihydrochloride, nicotine monotartrate, nicotine bitartrate, nicotine bitartrate dihydrate, nicotine sulphate, nicotine zinc chloride monohydrate, nicotine salicylate, nicotine benzoate or nicotine polacrilex.

Further, the pouched product for oral use as disclosed herein may be a smokeless tobacco product.

Typically, the amount of tobacco in the smokeless tobacco composition is within the range of from about 50 to about 80% w/w based on dry weight of the smokeless tobacco.

The pouched product as described herein further comprises a filling material which may have a moisture content of from 3 to 60% by weight depending on if the pouched product is a dry, moist or semi-dry pouched product. Generally, dry pouched products as described herein have a moisture content of 25% by weight or less and moist pouched products as described herein have a moisture content of 35% by weight or more. Semi-dry pouched products as disclosed herein have a moisture content between 25% by weight and 35% by weight.

The pouched product as described herein may be a moist or semi-dry pouched product and may comprise a filling material having a moisture content of from 35% by weight to 55% by weight, such as a moisture content of from 40% by weight to 55% by weight, such as a moisture content of from 40% by weight to 50% by weight.

The filling material in a pouched product as described herein may be a dry pouched product and may have a moisture content of from 2% by weight to 25% by weight, such as a moisture content of from 4% by weight to 15% by weight.

The pouched tobacco product, non-tobacco product or low-tobacco products for oral use as disclosed herein may comprise non-tobacco plant material and/or other types of filling material. Examples of non-tobacco plant material includes plant fibres selected from the group consisting of maize fibres, oat fibres, tomato fibres, barley fibres, rye fibres, apple fibres, sugar beet fibres, potato fibres, corn fibres, buckwheat fibres, cocoa fibres, bamboo fibres, citrus fibres and any combinations thereof. Also processed fibres such as Microcrystalline Cellulose (MCC) fibres, synthetic polymeric fibres, etc. may be used. The filling material, such as plant material, cellulose and starch may be present in the form of particles or as a combination of particles and fibres. For instance, the filling material may comprise or consist of particles of microcrystalline cellulose The pouched tobacco product, non-tobacco product for oral use or the pouched low tobacco product may further comprise one or more of the following: water, salt (e.g. sodium chloride, potassium chloride, magnesium chloride, calcium chloride and any combinations thereof), pH adjuster (e.g. sodium hydroxide, potassium hydroxide, potassium carbonate, sodium carbonate, sodium bicarbonate or magnesium carbonate), flavouring agent, cooling agent, heating agent, sweetening agent, colorant, humectant (e.g., propylene glycol or glycerol), antioxidant, preservative (e.g. potassium sorbate), binder, disintegration aid.

Further, the pouched product as disclosed herein is compostable, i.e., more than 90% of the pouched product is disintegrated into smaller than 2 mm fractions within 12 weeks of composting, according to the industrial composting standard ISO 16929 (2021) (Plastics-Determination of the degree of disintegration of plastic materials under defined composting conditions in a pilot-scale test). This provides an improved environmentally friendly pouched oral product.

Further, the pouched product as disclosed herein may be compostable according to the methods as described herein within 10 weeks of composting, such as within 8 weeks, such as within 6 weeks, such as within 4 weeks.

The pouched product as disclosed herein is a saliva-permeable pouch which may have two opposing end seals, where the seal strength of the end seals may be equal to or above 0.1 N/mm, such as in the range of from 0.1 N/mm to 0.6 N/mm, such as in the range of from 0.12 N/mm to 0.6 N/mm, such as in the range of from 0.15 N/mm to 0.4 N/mm, such as in the range of from 0.2 N/mm to 0.6 N/mm as measured according to the seal strength method as disclosed herein. The seal strength should be sufficient to preserve the integrity of the pouched product while not being hard or stiff which may detract from a consumer's experience during use of the pouched product. A stronger seal may be accomplished by increasing the sealing area and/or by increasing the amount of binder in the pouch material. However, broad seals as well as a high binder content may produce stiff and hard seals which may cause user discomfort. Hence, from a comfort point of view, it may be desirable to minimize the amount of binder and the binding area in the seals. On the other hand, the seals must be strong enough so that they stay intact during use and so that the filling material in the saliva-permeable pouch cannot escape out of the pouch through a burst seal.

It has surprisingly been found that sufficient seal strength may be obtained by the binders as disclosed herein even at binder levels considerably below the binder levels of conventional pouch materials where the binder level generally is at least about 40% by weight based on the total weight of the pouch material.

Sealing of the end seals of the pouch product for oral use as described herein may be performed by any suitable method such as heat welding or ultrasonic welding. With the nonwoven materials comprising a biodegradable polyester-polyurethane binder as disclosed herein, it is possible to obtain biodegradable oral pouched products without using mechanical sealing methods or adhesives. This is a considerable advantage as both mechanical and adhesive sealing methods are comparatively slow as compared to welding methods. Furthermore, handling of adhesives in a production process comprising filling of a loose material in a small nonwoven pouch may be a technically complicated task.

In a pouched product for oral use as disclosed herein, durable seals which are soft and comfortable for the user may be formed by applying a lower level of binder as compared to the amount of binder required when using conventional chemical binders. Since an oral pouched product as disclosed herein is intended to be retained between the upper or lower gum and the lip or cheek of a user for a period of time, it is desirable that it is soft and conformable and not irritating or chafing to the user's mucosal membranes in the mouth. Accordingly, the mouth feeling for the user is of great importance for the oral pouched product.

Consequently, the low amount of binder present in the pouch material contributes to improving the organoleptic properties of the oral pouched products as disclosed herein.

The filling material of the pouched product as disclosed herein may further comprise a flavouring agent. The flavours which are used are generally natural or nature identical compounds that comply with food regulations. Flavours may for example be dry, encapsulated or dissolved in a solvent, such as ethanol, when added.

It has earlier been observed that flavoring agents in the filling material, in particularly in moist and semi-dry products, may migrate to the pouch paper and hence affect the seal strength negatively, i.e., generating weaker seal strength. Therefore, it was unexpected to obtain seals having sufficient seal strength even in the presence of a flavoring agent in the filling material despite the low binder content in the nonwoven material used in the oral pouched products as disclosed herein.

A biodegradable product is desirable for many reasons. The used product is in the form of a pouch of a nonwoven material filled with a moist filling material which is spitted out and discarded. It is advantageous for the environment that the product is biodegradable so it can be recycled as compost, preferably in a home-composting environment. Furthermore, biodegradability of the products may mitigate the negative effects of littering in that products which are unintentionally or intentionally thrown on the ground will degrade and disintegrate over time.

The product as disclosed herein is preferably made from biodegradable and preferably also biobased materials. As set out herein, it may be preferred that the product is degradable under home composting conditions. However, it may be sufficient that the product meets industry compost standards, as a used, discarded product may then be sorted together with other industry compostable materials.

Pouched products for oral use are produced by measuring portions of a filling material, e.g., a smokeless non-tobacco composition or a tobacco composition, and inserting the portions into a nonwoven tube.

U.S. Pat. No. 4,703,765 discloses a device for packaging precise amounts of finely divided tobacco products, such as snuff tobacco or the like, in a tubular packaging material into which snuff portions are injected via a fill tube, the tubular packing material thereby having a vertical orientation. Downstream from the tube, welding means are positioned for transverse sealing of the packaging material, as well as cutting means for severing the packaging material in the area of the transverse seal to thus form discrete or individual portion packages.

EP 2 428 450 B1 relates to a snus dosing method, wherein a portion of tobacco is filled into a dosing chamber of a dosing device and then blown out of the dosing chamber by means of blow-out air to which water vapor has been added.

Pouched products for oral use may alternatively be produced by placing portions of a filling material, such as moist snuff, on a nonwoven web using a pouch packer machine in accordance with the device disclosed in U.S. Pat. No. 6,135,120. This device comprises feeding means for feeding the filling material into pockets formed in a rotary portioning wheel for portioning the material into portions, at least one compression means for compressing the filling material portions, a unit for advancing a packaging material, such as a nonwoven web, in synchrony with the compressed portions, at least one discharge means for discharging the portions from the pockets to the packaging material, and a forming unit for forming individual portion packages (i.e. pouched products for oral use) from the discharged portions and the packaging material. At the intended point of discharge of the portions to the packaging material, said packaging material has the form of a tape, the compression means being arranged to compress the portions in a direction which differs from the discharging and the feeding directions. The compression is preferably performed in a direction perpendicular to the discharging and the feeding directions. The compression may be performed in the axial direction of the portioning wheel whereas the feeding and discharging may be performed in the radial direction of said wheel. This technique is herein referred to as the "NYPS" technique.

The individual portions are sealed and cut apart thereby forming rectangular "pillow shaped" (or any other desired form) pouched products. Generally, each final pouched product includes parallel transverse seams at opposite ends and a longitudinal seam orthogonal to the transverse seams. The seals must be of sufficient strength to preserve the integrity of the pouched product during use while not disturbing the consumer's experience.

Manufacturing of non-tobacco compositions and products may be similar to the procedure of manufacturing oral smokeless tobacco snuff compositions and products except for that the tobacco material is replaced by a non-tobacco plant material and/or a filling material. Manufacturing of non-tobacco compositions and products are e.g., described in WO 2007/126361 and WO 2008/133563. Manufacturing of nicotine-containing non-tobacco compositions and products is described in e.g., WO 2012/134380.

An oral pouched (i.e., portion-packed) product, such as a pouched smokeless tobacco or pouched smokeless non-tobacco product for oral use, as disclosed herein, may be positioned randomly in a container or in a pattern, for instance as described in WO 2012/069505. Alternatively, or additionally, each oral pouched product may be placed in a sachet.

The pouched product may be packaged in a box, can, canister, cardboard box, bag, stick-pack wrapping, plastic wrapping, paper wrapping, foil wrapping, blister pack or on a tray.

The invention will be further described in the following examples, which do not limit the scope of the invention described in the claims.

Definitions

The terms "oral" and "oral use" refer to a use of a product in contact with mucous membranes in the oral cavity of a human being, such as buccal placement of the product in the oral cavity. The products for oral use as disclosed herein are intended to be placed in their entirety in the oral cavity and are not intended to be swallowed.

As used herein the terms "pouched product for oral use" or "oral pouched product" refer to a portion of a smokeless composition containing saliva extractables and being packed in a saliva-permeable pouch material.

As used herein, the term "moisture content" refers to the percent by weight (wt %) of oven volatile substances, such as water and other oven volatiles (e.g., propylene glycol and ethanol) in a component material, a composition or a product. The moisture content is determined according to the Loss on Drying (LOD) method disclosed herein.

The term "filling material" as used herein refers to the material inside the pouch of an oral pouched product as disclosed herein. The filling material may be a filling material predominantly constituted by tobacco material or may be a filling material based on non-tobacco material such as particles of cellulose, starch, silica, botanical fibres other than tobacco fibres, synthetic fibres, etc. The filling material may comprise components such as salts (e.g., sodium chloride, potassium chloride, magnesium chloride, calcium chloride and any combinations thereof), pH adjusters (e.g., sodium hydroxide, potassium hydroxide, potassium carbonate, sodium carbonate or sodium bicarbonate), flavouring agents, sweeteners, colorants, humectants (e.g., propylene glycol or glycerol), antioxidants, preservatives (e.g., potassium sorbate), binders, tobacco and non-tobacco plant material.

The terms "flavour" or "flavouring agent" are used herein for substances used to influence the aroma and/or taste of the oral pouched product, including, but not limited to, essential oils, single flavour compounds, compounded flavourings, and extracts.

By "tobacco" or "tobacco material" is meant any part, e.g., leaves, stems, stalks, and flowers, of any member of the genus *Nicotiana*.

A "particle" as used herein may have any useful size including very small particles having a particle size in the order of 100 μm or less, up to particle sizes in the order of 4 mm. The particles may be irregularly shaped, such as particles produced by grinding or crushing or may have a regular shape, such as a rod-shape, a rounded shape including a spherical shape, an egg-shape, etc., as well as a polygonal shape such as a pyramidal shape, a rectangular/cubic shape, etc.

A "particulate material" as used herein is a material which is composed of particles. The particulate material may have a narrow particle size distribution or may contain particles of different sizes.

By a "cover material" as used herein is implied any suitable saliva permeable packaging material as known in the art. The cover material may also be referred to as a "pouch material". The cover materials used for the oral pouched products as disclosed herein are nonwoven cover materials comprising fibres and a binder, such as a chemical binder. The nonwoven materials may be produced by carding staple fibres to form a fibrous fleece, followed by consolidating the carded fibrous fleece by means of the binder. The covering material may optionally comprise additional components such as flavouring agents and/or colorants.

Pouched products for oral use are normally sized and configured to fit comfortably and discreetly in a user's mouth between the upper or lower gum and the lip. In general, pouched products for oral use have a generally rectangular shape. Some typical formats (length×width) of commercially available pouched products for oral use are: 35 mm×20 mm, 34/35 mm×14 mm, 33/34 mm×18 mm, 27/28 mm×14 mm, 34 mm×10 mm and 38×14 mm. A pouched product for oral use as disclosed herein may have a maximum length within the range of from 25 mm to 40 mm in a longitudinal direction of the product and a maximum width within the range of from 5 mm to 20 mm in a transverse direction of the product. The pre-use thickness of the pouched product is normally within the range of from 2 mm to 8 mm as measured under an applied load of 0.5N. The total weight of commercially available pouched products for oral use is typically within the range of from about 0.3 g to about 3.5 g, such as from about 0.5 g to 1.7 g, per pouched product. The volume of a portion of filling material in a pouch may be in the range of from 0.5 $cm^3$ to 1.5 $cm^3$, depending on the size of the pouch.

A "user container" typically contains in the range of 10-30 pouched products, such as in the range of 20-25 pouched products. The pouched products may be placed randomly in the user container or in a pattern, for instance as described in WO 2012/069505 A1. The user container as disclosed herein is a consumer package having a shape and a size adapted for conveniently carrying the consumer package in a pocket or in a handbag and may be used for packaging any known type of pouched product for oral use. The user container may include a disposal compartment for storage of used oral pouched products. The disposal compartment is separated from the compartment in the container where the fresh oral pouched products are stored up until use.

The term "compostable" when used herein in connection with an oral pouched product is defined as disintegration of more than 90% of the oral pouched product into smaller than 2 mm fractions within 12 weeks of composting under defined composting conditions in a pilot-scale test according to industrial composting standard ISO 16929 (2021) (Plastics).

As used herein, a material is "biodegradable" if it is compostable according to the industrial composting standard ISO 16929 (2021) (Plastics) as defined herein.

By "regenerated fibres", which are also called semi-synthetic fibres, is meant normally cellulose regenerated fibres, also called reconstituted cellulosic fibres, such as rayon. The regenerated cellulose used in the manufacturing of rayon fibres is normally derived from wood pulp, but regenerated cellulose from other origins, such as bamboo, may also be used.

"Viscose rayon staple fibres" may be formed by extruding a viscose solution. i.e., a solution of cellulose xanthate, through a spinneret and as the viscose exits the spinneret, it lands in a bath of mineral acid, such as sulfuric acid, resulting in the formation of filaments. These filaments are then cut to a desired length, thereby forming staple fibres.

"Lyocell" is a form of regenerated cellulose made from dissolving pulp, i.e., bleached wood pulp.

A "low tobacco filling material" is a filling material comprising only a small amount of tobacco. The amount of tobacco in a low tobacco filling material is in the range of from 0.1 wt % to 10 wt % based on the total dry weight of the low tobacco filling material. A low tobacco filling material may comprise nicotine in addition to nicotine from the tobacco material.

The nicotine in a nicotine containing tobacco free or low tobacco content filling material may be added in the filling material in the form of a nicotine base and/or may be selected from the group consisting of nicotine hydrochloride, nicotine dihydrochloride, nicotine monotartrate, nicotine bitartrate, nicotine bitartrate dihydrate, nicotine sulphate, nicotine zinc chloride monohydrate and nicotine salicylate, nicotine benzoate, nicotine polacrilex and any combination thereof.

BRIEF DESCRIPTION OF DRAWINGS

The present invention will be further explained hereinafter by means of non-limiting examples and with reference to the appended drawings wherein.

It is to be understood that the drawings are schematic and that individual features and components, are not necessarily drawn to scale.

Figure 1:
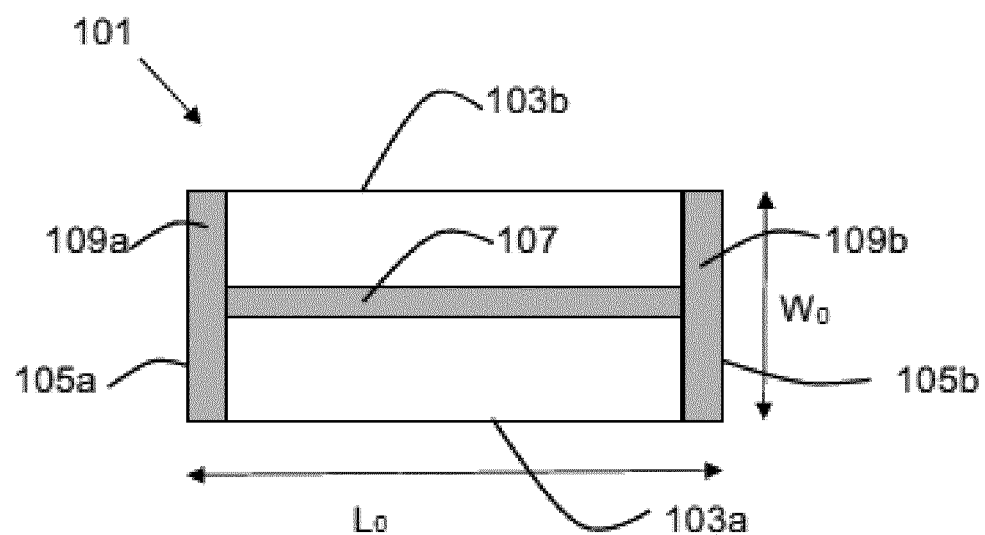
FIG. 1 shows a pouched product for oral use as disclosed herein.

FIG. 1 schematically illustrates a pouched product 101 for oral use as disclosed herein. The pouched product 101 as shown in FIG. 1 has a rectangular shape with a maximum length $L_0$ extending in a length direction and a maximum width Wo extending in a width direction, whereby the maximum length $L_0$ is greater than the maximum width Wo. The pouched product 101 as shown in FIG. 1 comprises a filling material and a saliva-permeable pouch enclosing the filling material. The pouched product 101 as shown in FIG. 1 comprises two long side edges 103a, 103b and two short side edges 105a, 105b. The pouched product 101 as shown in FIG. 1 also has an extension in a height direction, being perpendicular to the length direction and to the width direction, however not seen in this perspective.

The pouched product 101 as shown in FIG. 1 comprises at least one seal 107 extending in the length direction. Typically, and as illustrated in FIG. 1, there is a single seal 107 extending in the length direction. This seal is often called a longitudinal seal, since, when manufacturing the pouched product 101 as shown in FIG. 1, this seal is made along the direction of travel of the web forming the pouch. The longitudinal seal is often positioned spaced apart from the long side edges 103a, 103b. Thereby it is often preferred to position it at or close to the longitudinal centre-line, as is illustrated in FIG. 1. The longitudinal seal 107 may be made by any method known to the skilled person, e.g., by means of heat-welding and/or ultrasonic sealing.

Further, the pouched product 101 as shown in FIG. 1 comprises two seals 109a, 109b extending in the width direction. The two seals 109a, 109b seal the two short side edges 105a, 105b and thus form edge seals. These seals 109a, 109b are often called transverse edge seals, since, when manufacturing the pouched product 101 as shown in FIG. 1, these edge seals are made transverse to the direction of travel of the web forming the pouch. The transverse edge seals 109a, 109b may be made by any method known to the skilled person, e.g., by means of heat-welding and/or, ultrasonic sealing. Since the transverse edge seals 109a, 109b are made after the longitudinal seal 107, i.e., downstream of the longitudinal seal 107 in the manufacturing apparatus, the longitudinal seal 107 is included in the transverse edge seals 109a, 109b, i.e., the longitudinal seal 107 forms part of the transverse edge seals 109a, 109b, e.g., the longitudinal seal 107 being welded into the transverse edge seals 109a, 109b.

DETAILED DESCRIPTION

Method for Determining Moisture Content, Loss on Drying (LOD)

The moisture content as referred to herein may be determined by using a method based on literature references Federal Register/vol. 74, no. 4/712-719/Wednesday, Jan. 7, 2009/Notices "Total moisture determination" and AOAC (Association of Official Analytical Chemics), Official Methods of Analysis 966.02: "Moisture in Tobacco" (1990), Fifth Edition, K. Helrich (ed). In this method, the moisture content is determined gravimetrically by taking 2.5±0.25 g sample and weighing the sample at ambient conditions, herein defined as being at a temperature of 22° C. and a relative humidity of 60%, before evaporation of moisture and after completion of dehydration. Mettler Toledo's Moisture Analyzer HB43, a balance with halogen heating technology, is used (instead of an oven and a balance as in the mentioned literature references) in the experiments described herein. The sample is heated to 105° C. (instead of 99.5±0.5° C. as in the mentioned literature references). The measurement is stopped when the weight change is less than 1 mg during a 90 second time frame. The moisture content as weight percent of the sample is then calculated automatically by the Moisture Analyzer HB43.

EXAMPLES

Example 1

In this example, the effect on seal strength of a nonwoven material having various concentrations of biodegradable polyester-polyurethane binder, was analysed. Both seals generated by heat-welding and ultrasonic sealing were measured respectively. As reference, a nonwoven material comprising 40% acryl vinyl acetate (AVA) as a binder was used.

Dry laid nonwoven in accordance with the present disclosure was manufactured by spreading viscose staple fibres on a conveyor belt and forming a single-layer web by carding. The dry laid nonwoven was thereafter bound by impregnation using an aqueous dispersion of a biodegradable polyester-polyurethane binder.

Three different nonwovens having different concentrations of biodegradable polyester-polyurethane binder were manufactured, i.e., nonwovens with 17%, 21% or 29% by weight of biodegradable polyester-polyurethane binder, respectively.

The viscose fibres used had a linear mass density of 1.7 decitex and staple fibre with an average fiber length of 40 mm.

The aqueous dispersion of the polyester-polyurethane binder used was Epotal® ECO 3702, provided by BASF.

For comparative data, a reference nonwoven which is used in commercially available smokeless tobacco and non-tobacco products was used. This nonwoven comprises a binder of about 40% AVA, and staple fibres of viscose having an average linear mass density of 1.7 decitex and an average staple fibre length of 40 mm.

Sealings were made by heat-welding and ultrasonic sealing respectively and the respective sealing strength was thereafter measured.

The heat sealing strength of the manufactured nonwovens, in dry state, was measured on a cut out strip 201 of the respective nonwoven having a length of about 1 m in the machine direction (MD) of the nonwoven and a width of 40 mm in the cross-machine direction (CD) of the nonwoven. The strip 201 was then double folded to obtain a two-ply material having a length of about 0.5 m. The two plies were welded to each other in a HS-2 laboratory heat sealer from RDM Equipment. The dimensions of upper and lower seal bars were 50 mm×5 mm. The seal bars were applied such that the 50 mm direction is perpendicular to the length direction of the double-folded strip. The upper seal bar was heated to 300° C. The lower seal bar was not heated. The force used to press the seal bars against the nonwoven was 0.24 kN and the contact time was 0.06 s. A number of seals 202 were formed in the double-folded strip see thick grey lines 202 in FIG. 2. The samples to be measured were then made by cutting at about 5 mm from the seal at one side and at about 50 mm from the seal on the other side of the seal, see dashed lines 203 in FIG. 2.

The heat seal strength of the nonwoven material was measured using an Instron 5943 instrument as follows. One ply was attached to the upper gauge and one ply to the lower gauge. The force used to peel apart the seal was determined and expressed as load per width at maximum load (Newton per millimeter, i.e., N/mm). As used herein, N stands for Newton, mm stands for millimeter(s) and min stands for minute(s). The following machine parameters were used:

load range: 50N
extension: 10 mm
gauge length: 13 mm
speed: 30 mm/min
preload: 0.1N
sample width: 33-43 mm The ultrasonic seal strength of the manufactured nonwovens, in dry state, was measured on a cut out strip of the respective nonwoven having a length of about 30 cm in the machine direction (MD) of the nonwoven and a width of 20 mm in the cross-machine direction (CD) of the nonwoven. The strip was then double folded to obtain a two-ply material having a length of about 15 cm. The two plies were welded to each other in a laboratory ultra sound sealer from Swiss sonic using an anvil and an ultrasonic horn as disclosed in WO 2017/093486 A1, 0.06 s and an amplitude of 80%. The samples to be measured were then made by cutting at about 5 mm from the seal at one side and at about 50 mm from the seal on the other side of the seal.

The results are presented in Table 1 below. Each measured value is the average value of five analysed samples.

TABLE 1

| Seal Strength (heat seal) | Seal Strength (ultrasonic) |
|---|---|
| Seal strength [N/mm] - Epotal® 17% | |
| 0.21 | 0.14 |
| Seal strength [N/mm] - Epotal® 21% | |
| 0.35 | 0.2 |
| Seal strength [N/mm] - Epotal® 29% | |
| 0.36 | 0.14 |
| Seal strength [N/mm] - Reference 40% AVA | |
| 0.14 | 0.12 |

It was observed that all nonwovens having the biodegradable polyester-polyurethane binder Epotal® ECO 3702 had higher heat seal strengths than the Reference material having 40% AVA as a binder.

It was also observed that nonwoven comprising 21% by weight of biodegradable polyester-polyurethane as a binder had higher ultrasonic seal strengths than the Reference material having 40% AVA as binder. Further, nonwoven comprising 17%, respective 29% by weight of biodegradable polyester-polyurethane as a binder had higher ultrasonic seal strengths than the Reference material having 40% AVA as binder.

Example 2

In this example, the flavour stability was measured, i.e., the heat seal strength of the nonwoven when exposed to different flavours in a dual trough chamber.

Figure 2:
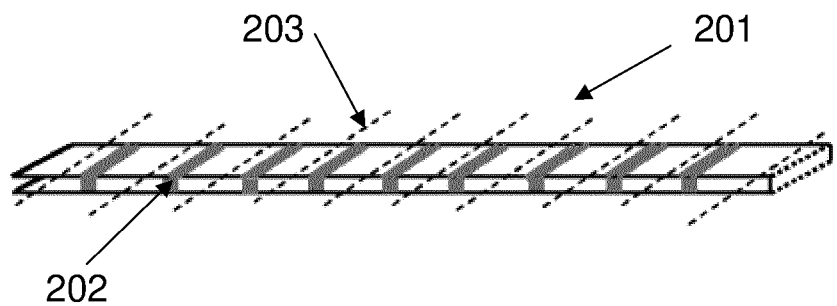
FIG. 2 shows a sample used in a method for determining heat sealing strength.

Nonwoven material comprising 17%, 21% and 29% by weight of biodegradable polyester-polyurethane (Epotal®) as a binder as well as the Reference material comprising 40% AVA was manufactured in the same way as in Example 1 and heat seal welds were formed in a double-folded strip of the tested material as described in Example 1 and shown in FIG. 2. Samples were cut from the heat seal welds in the double-folded strip of tested material. The samples were cut such that the heat seal weld was placed at an end edge of the sample with the seal weld extending along the end edge of the sample and with free end portions of the two nonwoven layers forming flaps overlying each other and extending away from the heat seal weld. Each sample had an extension in the length direction of the heat seal weld of 12 mm and an extension perpendicular to the length direction of the heat seal weld of 30 mm. The number of tested samples in each measurement was 8. The samples were sized to correspond to usual pouch dimensions for an oral pouched product and may be thought of as a pouch for an oral pouched product with only one end seal and with the longitudinal side edges cut open.

The respective concentrated flavour, 6 ml, was added on one side of the dual trough chamber. The prepared welds were then placed on the other side of the dual trough chamber with the weld facing up. The dual chamber was covered with a lid and sealed with parafilm for 24 hours. After 24 hours, welding strength was measured as in Example 3, below.

The results are presented in Table 2 below. Each measured value is the average value of eight analysed samples.

TABLE 2

|  | Seal strenght [N/mm] | Standard deviation |
|---|---|---|
| Epotal ® 17% | | |
| Wintergreen | 0.08 | 0.01 |
| Peppermint | 0.13 | 0.05 |
| Spearmint | 0.12 | 0.04 |
| Menthol | 0.12 | 0.04 |
| Epotal ® 21% | | |
| Wintergreen | 0.14 | 0.03 |
| Peppermint | 0.23 | 0.06 |
| Spearmint | 0.20 | 0.04 |
| Menthol | 0.21 | 0.04 |
| Epotal ® 29 | | |
| Wintergreen | 0.17 | 0.07 |
| Peppermint | 0.17 | 0.10 |
| Spearmint | 0.18 | 0.15 |
| Menthol | 0.27 | 0.17 |
| Reference | | |
| Wintergreen | 0.02 | 0.01 |
| Peppermint | 0.03 | 0.01 |
| Spearmint | 0.03 | 0.01 |
| Menthol | 0.03 | 0.01 |

Figure 3:
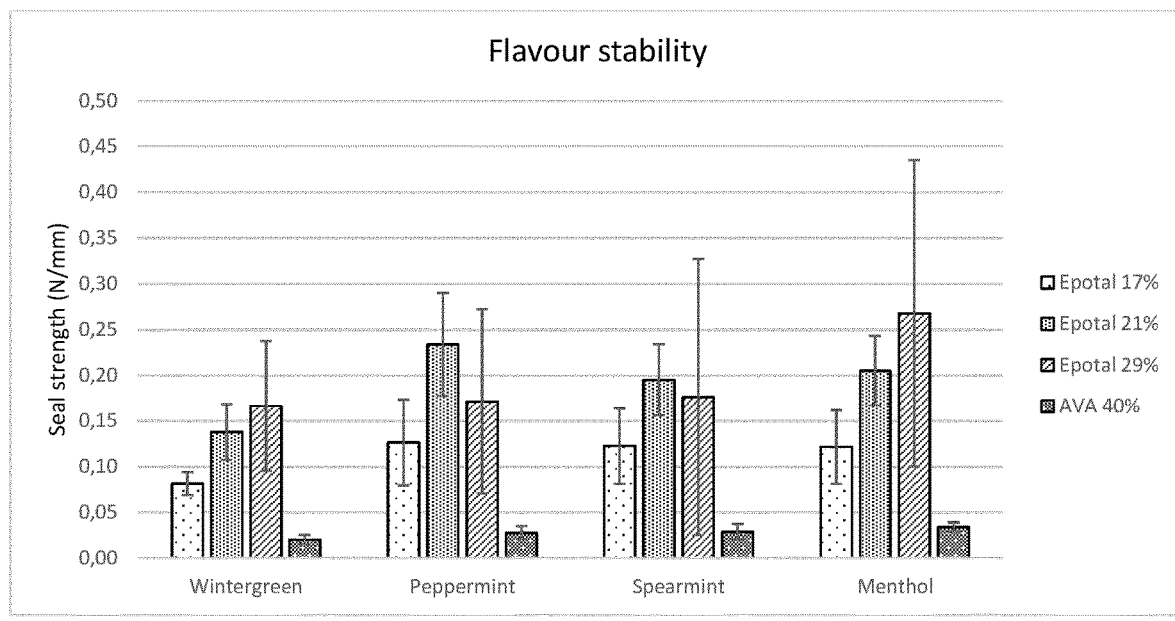
FIG. 3 shows the flavour stability, i.e., the seal strength of the nonwoven when exposed to different flavours in a dual trough chamber in Example 2.

It was observed that for all respective tested flavours (wintergreen, peppermint, spearmint and menthol) comprised in the respective nonwoven, both nonwovens having a concentration of 17%, 21% or 29% by weight of biodegradable polyester-polyurethane as a binder, had higher heat seal strengths than the Reference material having 40% AVA. The seal strength of the nonwoven when exposed to different flavours is visualized in FIG. 3.

Example 3

In this example, the seal strength of pouched products comprising the nonwoven material as described in Example 1, was measured during storage in consumer containers.

Pouched products comprising a filling material which is used in the commercially available product General White Portion, and wherein the pouch was made of nonwoven material comprising the biodegradable polyester-polyurethane binder Epotal®, as described in Example 1, was manufactured using the NYPS technique as described herein. Pouched products comprising a nonwoven with an Epotal®-concentration of 17%, 21%, and 29% by weight, respectively, were manufactured As a reference a pouched product was used having the same filling material as the pouched products described above and with the nonwoven cover material comprising 40% AVA binder according to Example 1.

The manufactured (by NYPS technique) pouched products were stored in consumer containers comprising about 20 pouches each. Samples for measuring heat seal strength of the pouched products were taken at three different times, namely at start (=0); after 1 week stored in refrigerator; and after 1 week stored in refrigerator followed by 3 weeks stored in room temperature. Further, in this document the expression "room temperature" stands for from about 20° C. to about 25° C. such as about 22° C.

The pouch heat seal strength was measured using an Instron 5943 instrument as follows. One ply is attached to the upper gauge and one ply to the lower gauge. The force used to peel apart the seal was determined and expressed as load per width at average load (Newton per millimeter(s), i.e., N/mm). The following machine parameters were used:
load range: 50 N
extension: 10 mm
gauge length: 13 mm
speed: 10 mm/min
preload: 0.1 N
sample width: 12 mm The results are presented in Table 3 below. Each measure value is the average value of twelve analysed samples.

TABLE 3

| Sample | Storage week | Seal strength [N/mm] | Standard deviation |
|---|---|---|---|
| Epotal ® 17% | 0 | 0.23 | 0.03 |
| Epotal ® 17% | 1 w fridge | 0.21 | 0.05 |
| Epotal ® 17% | 1 w fridge + 3 w room | 0.21 | 0.04 |
| Epotal ® 21% | 0 | 0.21 | 0.05 |
| Epotal ® 21% | 1 w fridge | 0.16 | 0.04 |
| Epotal ® 21% | 1 w fridge + 3 w room | 0.15 | 0.04 |
| Epotal ® 29% | 0 | 0.41 | 0.08 |
| Epotal ® 29% | 1 w fridge | 0.36 | 0.11 |
| Epotal ® 29% | 1 w fridge + 3 w room | 0.24 | 0.06 |
| Ref. | 0 | 0.14 | 0.02 |
| Ref. | 1 w fridge | 0.12 | 0.01 |
| Ref. | 1 w fridge + 3 w room | 0.09 | 0.02 |

It was observed that a heat seal strength above 0.12 N/mm was achieved for all pouches comprising Epotal® at both 17%, 21% and 29% by weight respectively, after storage up to 1 week in fridge followed by 3 weeks in room temperature.

Example 4

In this example, composting of a pouched product comprising a nonwoven material with a biodegradable polyester-polyurethane binder is evaluated.

The disintegration of a nicotine pouch having a filling material comprising a particulate microcrystalline cellulose-based filling material comprising nicotine, and where the nonwoven material of the pouch and a nonwoven material comprises a biodegradable polyester-polyurethane binder with a concentration of 21% by weight was evaluated during 4 weeks of a method of composting according to ISO 16929 (2021), simulating industrial composting conditions.

The test material, i.e., the pouched product having a length of 2.8 cm and width of 1.3 cm, was added to a mixture of fresh vegetable, garden and fruit waste and structural material.

Regularly during the test, the contents that were placed in a vessel, were turned manually. At each turning the visual appearance of the test item was carefully checked. During all the time for composting, operational parameters such as temperature and oxygen present were followed and the operational parameters showed that the test was valid, i.e., that the composting followed the set up as defined in the ISO 16929 (2021).

After one week of composting the test material was abundantly present in the vessel and remained completely intact. Two weeks later, i.e., after a total of three weeks composting, the major part of the test material had fallen apart into pieces of variable size. The disintegration proceeded and after four weeks of composting not a single test item piece could be retrieved. Hence, as all test item already was disintegrated after four weeks, the composting period was stopped.

It was observed that the pouched product comprising a particulate microcrystalline cellulose-based filling material comprising nicotine and a nonwoven having 21% by weight of biodegradable polyester-polyurethane binder was disintegrated into fractions of less than 2 mm during four weeks of composting according to the ISO 16929 (2021), simulating industrial composting conditions.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Unless expressly described to the contrary, each of the preferred features described herein can be used in combination with any and all of the other herein described preferred features.

The invention claimed is:

1. A pouched product for oral use comprising a saliva-permeable pouch and a filling material being enclosed in the pouch, wherein the pouch is formed from a nonwoven material comprising fibres and a binder, characterized in that the fibres in the nonwoven material are cellulose fibres and in that the binder is a biodegradable polyester-polyurethane binder applied to the fibres of the nonwoven material and wherein the binder is present in an amount within the range of from 17% by weight to 29% by weight based on a total weight of the pouch material, wherein the polyester-polyurethane binder has been applied to the fibres in the nonwoven material in the form of a polyester-polyurethane dispersion.

2. The pouched product according to claim 1, wherein the cellulose fibres comprise or consist of staple fibres having a fibre length in the range of from 10 mm to 52 mm.

3. The pouched product according to claim 2, wherein the nonwoven material is a dry-formed nonwoven material and wherein the staple fibres have a linear density in the range of from 0.9 decitex to 2.2 decitex.

4. The pouched product according to claim 3, wherein the dry-formed nonwoven material is a carded nonwoven material.

5. The pouched product according to claim 1, wherein the nonwoven material is a wet-laid nonwoven material and wherein the cellulose fibres comprise or consist of staple fibres having a fibre length in the range of from 3 mm to 25 mm.

6. The pouched product according to claim 5, wherein the staple fibres have a linear density in the range of from 0.7 decitex to 6 decitex.

7. The pouched product according to claim 1, wherein the cellulose fibres comprise or consist of regenerated cellulose fibres such as viscose fibres, lyocell fibres, or the like.

8. The pouched product according to claim 1, wherein the polyester-polyurethane binder is present in an amount within the range of from 17% by weight to 27% by weight based on the total weight of the pouch material.

9. The pouched product according to claim 1, wherein the pouched product for oral use is a smokeless non-tobacco product.

10. The pouched product according to claim 1, wherein the pouched product for oral use is a smokeless tobacco product.

11. The pouched product according to claim 1, wherein the pouched product for oral use is a moist pouched product and wherein the filling material has a moisture content of 35% by weight to 55% by weight.

12. The pouched product according to claim 1, wherein the pouched product for oral use is a dry pouched product and wherein the filling material has a moisture content of from 2% by weight to 25% by weight.

13. The pouched product according to claim 1, wherein more than 90% of the pouched product is disintegrated into smaller than 2 mm fractions within 12 weeks of composting, according to the industrial composting standard ISO 16929 (2021) (Plastics).

14. The pouched product according to claim 1, wherein the saliva-permeable pouch comprises two opposing end seals, a heat seal strength of the end seals being equal to or above 0.1 N/mm, as measured by an Instron 5943 instrument set with the following parameters:
   load range: 50N,
   extension: 10 mm,
   gauge length: 13 mm,
   speed: 30 mm/min,
   preload: 0.1N, and
   sample width: 33-43 mm.

15. The pouched product according to claim 1 wherein the filling material comprises a flavouring agent.

* * * * *